UNITED STATES PATENT OFFICE.

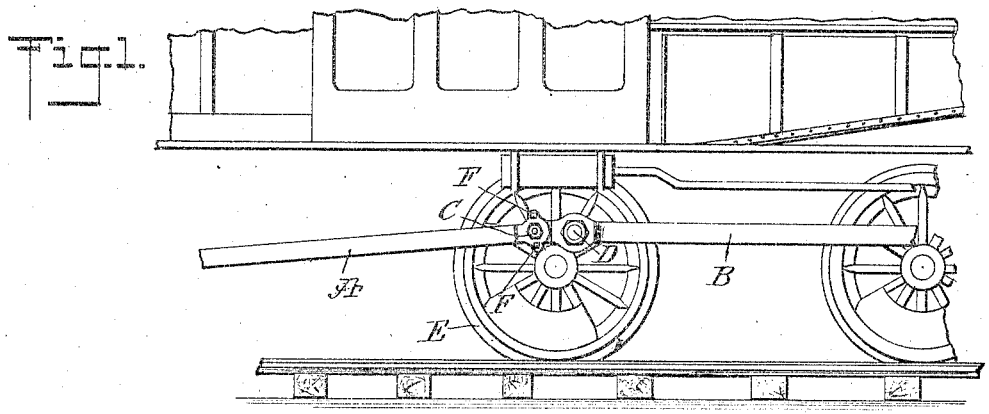
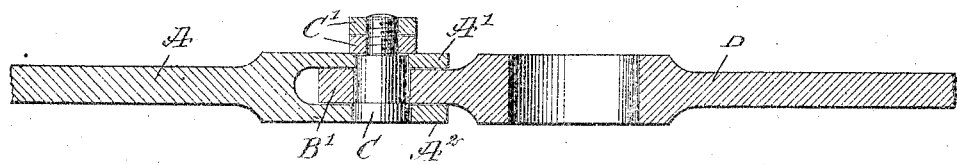
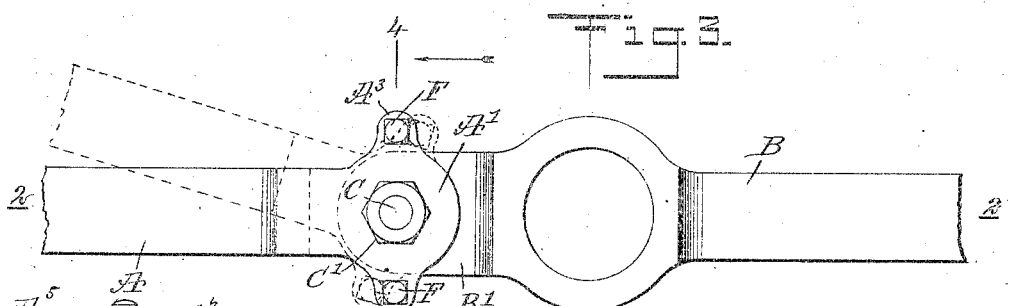

MICHAEL KELLY, OF BLOOMINGTON, ILLINOIS.

KNUCKLE-JOINT CONNECTION.

No. 927,978.   Specification of Letters Patent.   Patented July 13, 1909.

Application filed February 18, 1908, Serial No. 416,471. Renewed March 23, 1909. Serial No. 485,236.

*To all whom it may concern:*

Be it known that I, MICHAEL KELLY, a citizen of the United States, and a resident of Bloomington, in the county of McLean and State of Illinois, have invented a new and Improved Knuckle-Joint Connection, of which the following is a full, clear, and exact description.

The invention relates to the pivotal connection between the connecting rod and the parallel rod of a locomotive, and its object is to provide a new and improved knuckle joint connection, arranged to hold the pivot pin tight and to properly press the jaws, to prevent lost motion and uneven wear.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is an enlarged sectional plan view of the improvement on the line 2—2 of Fig. 3; Fig. 3 is a face view of the improvement; Fig. 4 is an enlarged transverse section of the same on the line 4—4 of Fig. 3; Fig. 5 is a side elevation of the improvement as applied to the strap of a connecting rod; and Fig. 6 is a plan view of the same.

As shown in Fig. 1, the connecting rod A of the locomotive is provided at its rear end with a fork, having its members $A'$, $A^2$ straddling the extension arm $B'$ of the parallel rod B, and the said fork members $A'$, $A^2$ and the extension arm $B'$ are connected with each other by the usual knuckle or pivot pin C. The parallel rod B engages the usual wrist pin D on the driving wheel E of the locomotive. The fork members $A'$, $A^2$ of the connecting rod A have extended portions $A^3$, $A^4$ reaching beyond the top and bottom of the extension arm $B'$ of the parallel rod B, and in the said extended portions $A^3$ of the fork member $A'$ screw the set screws F, abutting with their rear ends against the inner faces of the extended portions $A^4$ of the rear fork member $A^2$, as plainly indicated in Fig. 4. The set screws F are adapted to be locked in place after the desired adjustment is made, by jam nuts G screwing on the set screws F against the inner faces of the extended portions $A^3$ of the fork member $A'$.

Now in using this device, the nuts $C'$ of the knuckle or pivot pin C are screwed up in the usual manner, and then the set screws F are adjusted to spring the extended portions $A^3$, $A^4$ of the fork members $A'$, $A^2$ slightly apart, to insure a proper fit of the arm $B'$ between the fork members $A'$, $A^2$ without binding, so that a proper connection is had between the extension arm $B'$ and the fork members $A'$, $A^2$ by the pivot pin C, to prevent uneven wear of the pivot pin C, the arm $B'$ and the fork members $A'$, $A^2$.

It is understood that the pivot pin C has a slight taper fitting in the fork members $A'$, $A^2$, and on tightening the nuts $C'$ the middle portion of the rear fork member $A^2$ is drawn tight against the extension arm $B'$, but on adjusting the set screws F, the fork member $A^2$ is pressed in the opposite direction, and consequently a proper fit is had between the connected parts.

As shown in Figs. 5 and 6, the extended portions $A^5$, $A^6$ for the set screws F are formed integrally on the strap $A^7$ of the connecting rod, and in this case the action is the same as above described in reference to Figs. 1 to 4.

Having thus described my invention, I claim as new and desire to secure by Letters Patent:

1. A knuckle pin connection for locomotives, provided with a fork, an arm extending into the fork, a knuckle pin connecting the fork and the arm, and extensions on each arm of the fork above and below the knuckle pin, and means engaging said extensions for forcing them apart.

2. A knuckle pin connection for locomotives, provided with a fork, an arm extending into the fork, a knuckle pin connecting the fork and the arm, and extensions on each arm of the fork above and below the knuckle, and set screws threaded through the extensions of one fork and engaging the extensions of the other for the purpose set forth.

3. A knuckle joint connection comprising a connecting rod provided with a forked end, a parallel rod having an extension arm extending between the arms of the fork, a pivot pin traversing the arms and the extension, said arms being each provided with lugs above and below the said arms, and set screws threaded through the lugs of one arm, and engaging the lugs of the other arm whereby to spring said arms apart for the purpose set forth.

In testimony whereof I have signed my name to this specification in the presence of two subscribing witnesses.

MICHAEL KELLY.

Witnesses:
C. J. BRENNAN,
JOHN J. BRENNAN.